Figure 1:
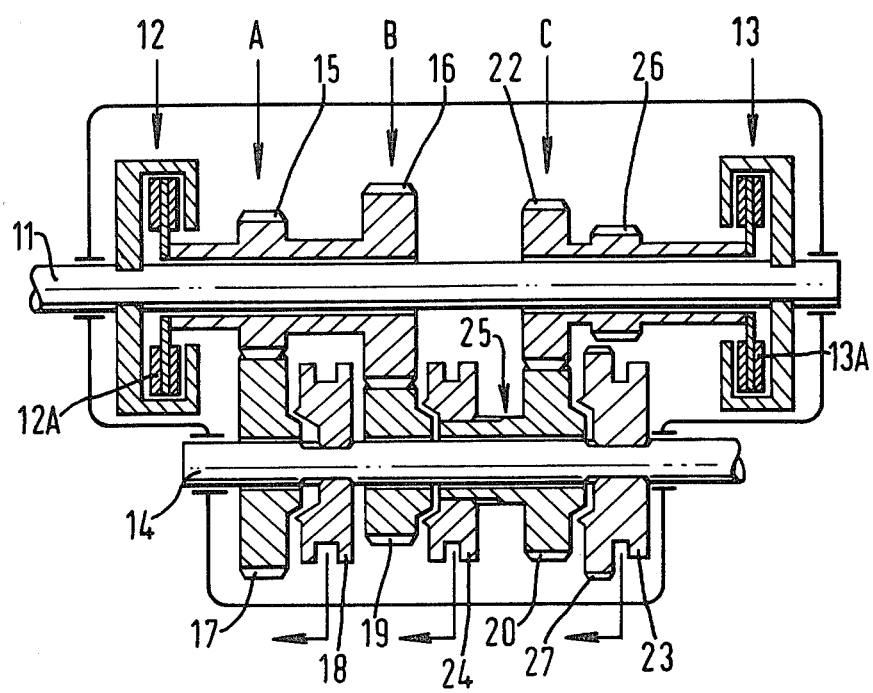

United States Patent [19]

Burke et al.

[11] Patent Number: 4,485,687
[45] Date of Patent: Dec. 4, 1984

[54] ROTARY TRANSMISSION

[75] Inventors: John P. Burke, Leamington Spa; Alastair J. Young, Kenilworth, both of England

[73] Assignee: Automotive Products plc, Leamington Spa, England

[21] Appl. No.: 386,357

[22] Filed: Jun. 8, 1982

Related U.S. Application Data

[63] Continuation-in-part of Ser. No. 358,434, Mar. 15, 1982, abandoned.

[30] Foreign Application Priority Data

Mar. 27, 1981 [GB] United Kingdom ............. 8109718
Mar. 25, 1982 [GB] United Kingdom ............. 8208822

[51] Int. Cl.³ .............................................. F16H 3/08
[52] U.S. Cl. ...................................... 74/358; 74/330; 74/333; 74/360
[58] Field of Search ............... 74/330, 331, 333, 340, 74/358, 360

[56] References Cited

U.S. PATENT DOCUMENTS

| | | | |
|---|---|---|---|
| 2,599,801 | 6/1952 | Youngren et al. | 74/331 X |
| 2,825,232 | 3/1958 | Seiving et al. | 74/331 |

FOREIGN PATENT DOCUMENTS

| | | | |
|---|---|---|---|
| 135736 | 12/1949 | Australia | 74/330 |
| 201901 | 5/1956 | Australia | 74/333 |
| 638510 | 5/1962 | Canada | 74/330 |
| 619130 | 9/1935 | Fed. Rep. of Germany | 74/330 |
| 596575 | 8/1959 | Italy | 74/330 |
| 145827 | 6/1920 | United Kingdom . | |
| 585716 | 2/1947 | United Kingdom . | |
| 795260 | 5/1958 | United Kingdom . | |
| 1243945 | 8/1971 | United Kingdom | 74/330 |

Primary Examiner—Allan D. Herrmann
Assistant Examiner—Dirk Wright
Attorney, Agent, or Firm—Kemon & Estabrook

[57] ABSTRACT

A rotary transmission is of the dual clutch kind and includes three gear trains through which the clutches providing alternative drive paths between a common input shaft and a common output shaft. One clutch drives the output shaft either through a two-wheel gear train or through a three-wheel train of which the first wheel is a gear wheel driven directly from the input shaft, the second wheel is a gear wheel interengaged with the first wheel and journalled on the output shaft and the third wheel is a sleeve wheel journalled on and engageable with the output shaft so that the second wheel drives the output shaft through the sleeve wheel. The other clutch is arranged to drive the output shaft either through a two-wheel gear train of which the second gear wheel is provided by the sleeve wheel or through a six-wheel gear train of which all the gear wheels are members of the first, second and third mentioned trains. In another embodiment said one clutch drives the output shaft through a second two wheel gear train which forms part of the six wheel gear train.

8 Claims, 2 Drawing Figures

ROTARY TRANSMISSION

This is a continuation-in-part of our application Ser. No. 358,434, now abandoned filed Mar. 15, 1982, claiming priority from British Patent Application No. 8109718 filed Mar. 27, 1981.

This invention relates to rotary transmissions of the dual clutch kind by which is meant a transmission having gear trains each being one of a set providing a series of increasing speed ratios, and two clutches independently operable and providing alternative drive paths through the gear trains between a common input and a common output, the gear trains of alternate speed ratios in the set being driven respectively through one and the other clutch.

The invention is particularly though not exclusively applicable to drive transmissions for motor vehicles.

Examples of transmissions of the dual clutch kind are shown in British Patent Specification Nos. 145,827 (Bramley-Moore), 585,716 (Kegresse), and 795,260 (David Brown). To the best of our knowledge, none of these prior proposals has been commercially adopted.

Current motor vehicle design trends indicate than an increasing proportion of vehicle production will be front wheel drive. In order to reduce overall vehicle length and provide increased passenger accommodation many such front wheel drive vehicles have a transverse engine installation.

Small transverse engined vehicles have little space between the front wheel suspension and steering mechanisms to site the power unit. It has been proposed to place the transmission beneath the engine but this leads to a reduced ground clearance and to a high bonnet line with consequent reduced driver visibility. Although small transverse engined vheicles having transmissions placed alongside the engine are known it is uncommon to find such vehicles fitted with a fully automatic transmission since these transmissions are inherently more bulky than an equivalent manual transmission.

The present invention seeks to provide an improved transmission of the dual clutch kind, of compact size and suitable for fully automatic operation.

According to one aspect of the invention there is provided a rotary transmission having first, second and third gear trains each being one of a set providing a series of increasing speed ratios and two clutches independently operable and providing alternative drive paths through the gear trains between a common input shaft and a common output shaft, the gear trains of alternative ratios in the set being driven respectively through one and the other clutch, one clutch being arranged to drive the output shaft either through a two-wheel gear train or through a three-wheel train of which the first wheel is a gear wheel driven directly from the input shaft, the second wheel is a gear wheel interengaged with the first wheel and journalled on the output shaft and the third wheel is a sleeve wheel journalled on and engageable with the output shaft so that the second wheel drives the output shaft through a sleeve wheel, and the other clutch being arranged to drive the output shaft either through a two-wheel gear train of which the second gear wheel is provided by the sleeve wheel or through a six-wheel gear train of which all the gear wheels are members of the first, second and third mentioned trains.

Such a rotary transmission has the additional advantage that it provides four speed ratios from only three gear wheel pairs between an input shaft and an output shaft whereas a conventional single clutch transmission requires four gear wheel pairs. The cost of a transmission according to the invention can thus show substantial savings, gear wheels being relatively expensive components to manufacture.

Preferably the clutches are arranged one at each side of the set of gear trains. Such positioning of the clutches leads to a particularly compact arrangement and the driving gears of said first, second and third mentioned trains can be conveniently journalled on a common driving shaft for the clutches.

The two wheel gear train and three wheel train driven through said one clutch may have respective driving gears fast for rotation in common.

The two-wheel gear train which is driven through the said one clutch preferably includes a driven gear which is journalled on the output shaft, selector means being provided for drivably connecting the driven gear to the output shaft. The second wheel of the said three wheel gear train may be journalled on the output shaft between the sleeve wheel and the selector means for drivably connecting the aforesaid driven gear to the output shaft.

Preferably, the second gear wheel of the two-wheel gear train which is driven through said other clutch is arranged between selector means for drivably connecting the sleeve wheel to the second wheel of the three wheel gear train and a further selector means for drivably connecting the second gear wheel of the said two wheel gear train to the output shaft.

According to another aspect of the invention there is provided a rotary transmission having first, second and third gear trains each being one of a set providing a series of increasing speed ratios and two clutches independently operable and providing alternative drive paths through the first, second and third gear trains between a common input shaft and a common output shaft, the gear trains of alternative ratios in the set being driven respectively through one and the other clutch, characterized in that one clutch is arranged to drive the output shaft through a first two-wheel gear train or through a second two-wheel train, and the other clutch is arranged to drive the output shaft either through a two-wheel gear train of which the second gear wheel is provided by a sleeve wheel journalled on the output shaft and engageable either with the output shaft or with the second gear wheel of said second two wheel gear train, or through a six-wheel gear train of which all the gear wheels are members of the first, second and third mentioned trains.

Figure 2:
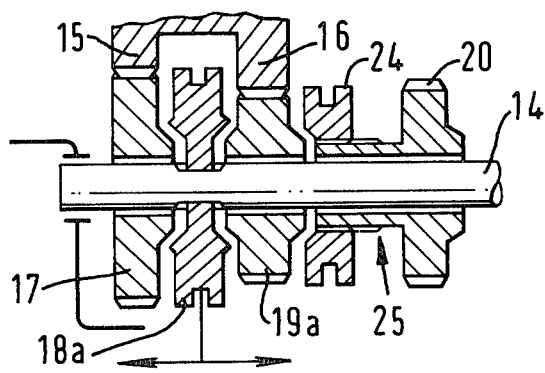

Rotary transmissions in accordance with the invention will now be described by way of example with reference to the accompanying drawings in which:

FIG. 1 is a schematic illustration of a four speed constant-mesh transmission for a front engine front wheel drive vehicle, and FIG. 2 illustrates part of a modified version of the transmission shown in FIG. 1.

With reference to FIG. 1, there is shown an input shaft 11 from an engine (not shown) and connectable through clutches 12, 13 and sets of two wheel gear trains A, B and C to drive an output shaft 14. The output shaft is for connection to the vehicle driving wheels through, for example, a differential gear.

One clutch 12 has driving gear wheels 15, 16 of gear trains A and B fast for rotation with its driven member 12A. A driven gear wheel 17 of train A is journalled on the layshaft 14 and is connectable thereto by a synchronizer assembly 18. Such a synchronizer assembly is well known in the rotary transmission art and will not be further described here.

A driven gear wheel 19 of train B is journalled on the layshaft 14 for connection thereto through a driven sleeve wheel 25 of train C as will be subsequently described.

Gear train C has a driving gear wheel 22 fast with the driven member of the other clutch 13 which makes with a driven gear 20 on the sleeve wheel. The sleeve wheel is journalled on the output shaft for connection thereto by a synchronizer assembly 23. Another synchronizer assembly 24 is mounted on the sleeve wheel 25 to connect that wheel to the driven gear wheel 19 of gear train B.

It is intended that operation of the clutches 12, 13 and the synchronizer assemblies 18, 23 and 24 will be in response to an electro-hydraulic automatic control system (not shown). A pump (not shown) to provide hydraulic fluid under pressure to such an electro hydraulic control system may be conveniently driven from the input shaft 11 between the gear trains B and C.

A reverse speed ratio may be provided in any conventional manner. In the present embodiment a drive gear 26 from the clutch 13 is connectable to a driven gear wheel 27 formed as part of the synchronizer assembly 23 through a disengageable lay gear (not shown). The lay gear reverses rotation of the drive from the input shaft 11 to the output shaft 14.

Operation of the transmission is as follows:

With the vehicle engine running, both clutches 12, 13 are initially disengaged, and the synchronizer assemblies 18, 23 and 24 are also initially disengaged.

To move off from rest synchronizer assemblies 18 and 24 are shifted to engage the respective gear wheels 17 and 19 and clutch 13 is engaged so that drive is transmitted through the six gear wheels 22, 20, 19, 16 15 and 17 of gear trains C, B and A to the output shaft 14. The novel arrangement of synchronizer assemblies provides for the driven gear wheels of trains B and C to be connected together for rotation in common about the output shaft 14, the driven member 12A of clutch 12 being driven idly about the input shaft 11.

Second speed ratio is preselected by the idle driving of clutch driven member 12A and the ratio change is effected by simultaneously disengaging clutch 13 and engaging clutch 12. Drive is now through gear train A to the layshaft and synchronizer assembly 24 may be disengaged.

Third speed ratio is preselected by the engagement of synchronizer 23 to drive clutch driven member 13A idly. At the appropriate moment clutch 13 is engaged as clutch 12 is disengaged and drive is transmitted through gear train C to the layshaft. Synchronizer assembly 18 may be disengaged.

Fourth speed ratio is preselected by engagement of synchronizer assembly 24. Engagement of clutch 12 as clutch 13 is disengaged provides drive through gear train B, sleeve wheel 25 and synchronizer assembly 23 constitute the aforesaid three-wheel train.

Ratio downchanges are effected in the reverse manner to the upchanges, by preselecting the next sequential speed ratio and changing drive from one clutch to the other.

Additional sets of gear wheels may be provided to increase the number of speed ratios available. The embodiment shown in FIG. 1 is only one of a number of alternative versions of the invention and it is not intended that the invention be limited by the particular arrangement of gear wheels and synchronizer assemblies disclosed.

One such alternative version is shown in FIG. 2. Instead of using a single sided synchronizer assembly 18 a double side synchronizer assembly 18a of known kind is used. The synchronizer assembly is engageable with the gear wheel 19a which replaces gear wheel 19 of FIG. 1. With such an arrangement it is possible to select the fourth speed ratio through the synchronizer assembly 18a instead of through the sleeve wheel 25 as in FIG. 1.

What we claim as our invention and desire to secure by Letters Patent in the United States is:

1. A rotary transmission comprising first, second and third gear trains each being one of a set providing a series of increasing speed ratios two clutches independently operable and providing alternative drive paths through the first, second and third gear trains, a common input shaft for the clutches and a common output shaft to which drive from the input shaft is transmitted by the transmission, the gear trains of alternative ratios in the set being driven respectively through one and the other clutch, one said clutch being arranged to drive the output shaft either through a two-wheel gear train or through a three-wheel train of which the first wheel is a gear wheel driven directly from the input shaft, the second wheel is a gear wheel interengaged with the first wheel and journalled on the output shaft and the third wheel is a sleeve wheel journalled on and engageable with the output shaft so that the second wheel drives the output shaft through the sleeve wheel, and the said other clutch being arranged to drive the output shaft either through a two-wheel gear train of which the second gear wheel is provided by the sleeve wheel or through a six-wheel gear train of which all the gear wheels are members of the first, second and third mentioned trains.

2. A rotary transmission according to claim 1, in which the said clutches are arranged one at each side of the set of gear trains.

3. A rotary transmission according to claim 2, in which driving gears are provided for said first, second and third mentioned trains, said driving gears being journalled on a common driving shaft for said clutches.

4. A rotary transmission according to claim 3, in which the two wheel gear train and three wheel train driven through said one clutch have respective driving gear wheels fast for rotation in common.

5. A rotary transmission according to claim 1 in which the two wheel gear train which is driven through the said one clutch includes a driven gear journalled on the output shaft, selector means being provided for drivably connecting the driven gear to the output shaft.

6. A rotary transmission according to claim 5 in which the said second wheel of the said three wheel train is journalled on the output shaft between the sleeve wheel and the selector means for drivably connecting to the output shaft the driven gear of the two-wheel gear train which is driven through said one clutch.

7. A rotary transmission according to claim 1 in which the sleeve wheel is arranged between the second wheel of the said three wheel train and selector means for drivably connecting the sleeve wheel to the output shaft.

8. A rotary transmission having first, second and third gear trains each being one of a set providing a series of increasing speed ratios and two clutches independently operable and providing alternative drive paths through the first, second and third gear trains between a common input shaft and a common output shaft, the gear trains of alternative ratios in the set being driven respectively through one and the other clutch, characterized in that one clutch is arranged to drive the output shaft through a first two-wheel gear train or through a second two-wheel train, and the other clutch is arranged to drive the output shaft either through a two-wheel gear train of which the second gear wheel is provided by a sleeve wheel journalled on the output shaft and engageable either with the output shaft or with the second gear wheel of said second two wheel gear train, or through a six-wheel gear train of which all the gear wheels are members of the first, second and third mentioned trains.

* * * * *